United States Patent
Alana et al.

(10) Patent No.: US 7,551,850 B2
(45) Date of Patent: Jun. 23, 2009

(54) HIGHLY AVAILABLE REDUNDANT OPTICAL MODULES USING SINGLE NETWORK CONNECTION

(75) Inventors: Mark Gregory Alana, Austin, TX (US); Barry S. Barnett, Austin, TX (US); Binh Thanh Chu, Austin, TX (US); Casimer Maurice DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 10/439,083

(22) Filed: May 15, 2003

(65) Prior Publication Data

US 2004/0228627 A1    Nov. 18, 2004

(51) Int. Cl.
*H04B 10/00* (2006.01)
*H04B 10/08* (2006.01)

(52) U.S. Cl. ............................................. 398/2; 398/22
(58) Field of Classification Search ..................... 398/2, 398/9, 19, 33, 164, 1, 5
See application file for complete search history.

(56) References Cited

U.S. PATENT DOCUMENTS

| | | | | |
|---|---|---|---|---|
| 5,726,788 A | * | 3/1998 | Fee et al. ..................... | 398/180 |
| 6,505,281 B1 | * | 1/2003 | Sherry ......................... | 711/168 |
| 7,032,135 B2 | * | 4/2006 | Harel et al. ................... | 714/43 |
| 7,151,893 B2 | * | 12/2006 | Hayashi et al. ................ | 398/7 |
| 2002/0133734 A1 | * | 9/2002 | Sarathy et al. ................ | 714/4 |
| 2003/0035408 A1 | * | 2/2003 | Hebert ....................... | 370/349 |
| 2003/0043432 A1 | * | 3/2003 | Marmur et al. ............. | 359/152 |
| 2003/0196135 A1 | * | 10/2003 | Gottlieb ....................... | 714/13 |

OTHER PUBLICATIONS

Dual Transponder Module (TM2-SFP) Datasheet by MRV Communications, 2002.*

* cited by examiner

*Primary Examiner*—Shi K Li
(74) *Attorney, Agent, or Firm*—Yee & Associates, P.C.; Diana Roberts-Gerhardt (57) ABSTRACT

A method is disclosed for providing highly available, redundant optical modules using a single network connection in a data processing system. An embedded network interface or network adapter card that occupies one network slot is included and includes a plurality of optical modules. The embedded network interface or network adapter card is used to communicate with a network utilizing one of the optical modules. One of the optical modules is currently designated as an active module. A redundancy controller is included on the network adapter card. The redundancy controller detects a failure of the optical module that is currently designated as the active module and changes the active module designation from the failed optical module to a remaining one of the optical modules such that the remaining one of the optical modules becomes designated as the active module. The embedded network interface or network adapter card then begins utilizing the newly designated optical module to communicate with the network.

12 Claims, 4 Drawing Sheets

HIGHLY AVAILABLE REDUNDANT OPTICAL MODULES USING SINGLE NETWORK CONNECTION

BACKGROUND OF THE INVENTION

1. Technical Field

The present invention relates generally to the field of computer systems and more specifically to a method, system, and computer program product for providing highly available, redundant optical modules using a single network connection.

2. Description of Related Art

Optical connections in a network are made between optical modules, also called optical transceivers, such as the Gigabaud Link Module (GLM) and GigaBaud Interface Converter GBIC, and fiber optic cables. Optical modules such as the GLM and GBIC are designed such that they can be replaced during normal operation in part due to their relatively high failure rate. The potential for an optical module failure per unit time in large scale high speed network environments can be very high.

A first order evaluation depicts the problem that this behavior presents. A typical large scale optical storage network consists of a cascade of eight 256 port switches with assorted attached clients, hosts, storage servers, protocol converters, and routers. The total number of optical components or modules contained in this network is on the order of 8×256×2=4096. A reasonable expectation time to failure in this environment is approximately 7.7 days or approximately one optical module failure per week. Optical failures per unit time increase in direct proportion to the number of ports being considered. Large scale optical networks, and especially storage networks, cannot tolerate such high failure rates from both an operational and maintenance perspective.

In many cases optical module failures represent a single point of failure in networks and can affect the normal operation of the network and business continuity. When an optical module fails it must be replaced as soon as possible in order to bring network operations back to the normal or expected state. Since optical module failures are in most cases unpredictable and occur at high rates, they generally have a large impact for on-line operations and affect the ability to maintain the network in an orderly and scheduled manner.

Prior art network adapter cards included only the single optical module. A prior art approach to solve the problem has been to add extra network adapter cards where each card had only the single optical module. This approach requires additional adapter slots to accommodate the additional network interface cards. Additional cabling is also necessary. This approach also doubles the overall failure rate.

Prior art embedded network interfaces are integrated directly on the network component circuit board, storage component circuit board, or computer circuit board. A prior art approach to solve the problem has been to add an extra network interface where each interface contains a single optical module. This approach requires twice as much circuitry, circuit board space, and cabling. This approach also doubles the overall failure rate.

Therefore, a need exists for a method, system, and computer program product for providing highly available, redundant optical modules using a single network connection.

SUMMARY OF THE INVENTION

A method, system, and product are disclosed for providing highly available, redundant optical modules using a single network connection in a data processing system. An embedded network interface or network adapter card is included that occupies one network slot, and each includes a plurality of optical modules. The embedded network interface or network adapter card is used to communicate with a network utilizing one of the optical modules. One of the optical modules is currently designated as an active module. A redundancy controller is included on the embedded network interface or network adapter card. The redundancy controller detects a failure of the optical module that is currently designated as the active module and changes the active module designation from the failed optical module to a remaining one of the optical modules such that a remaining one of the optical modules becomes designated as the active module. The embedded network interface or network adapter card then begins utilizing the newly designated optical module to communicate with the network.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and product for providing highly available, redundant optical modules using a single network connection. The present invention adds an additional controller and one or more redundant optical modules to a single optical network adapter card or single embedded network interface. The present invention requires only one embedded network interface or one network slot to accommodate the single card. In addition, only one set of cables is required to connect this card or network interface to the network.

The network adapter card or embedded network interface includes a plurality of optical modules. The network adapter card or embedded network interface is used to communicate with a network utilizing one of the optical modules. One of the optical modules will be designated as an active module. A redundancy controller is included on the network adapter card or embedded network interface. The redundancy controller detects a failure of the optical module that is currently designated as the active module and changes the active module designation from the failed optical module to a remaining one of the optical modules such that a remaining one of the optical modules becomes designated as the active module. The network adapter card or embedded network interface then begins utilizing the newly designated optical module to communicate with the network.

The present invention verifies whether or not the active and standby modules are operating properly. The present invention detects a failure of an optical module. When it is determined that it is the active optical module that has failed, the present invention executes a switchover to the redundant optical module so that the standby module becomes the active module. This process may be executed while the embedded network interface or network card is operating.

The present invention also detects the insertion of a replacement module and verifies whether or not it is working properly.

The present invention avoids the loss of link level connections that typically occur today when an optical module fails. The present invention achieves this goal by defining a new controller for a redundant active-standby optical module configuration that can detect the loss of the active optical module input and/or output and immediately switch-over or fail-over to a standby optical module. The optical module fail-over operation allows a single network connection to recover within acceptable time limits and therefore maintain network operations and operational continuity. The present invention also provides support for scheduled maintenance procedures and concurrent hot-pluggable replacement of the defective optical modules in the form of visual failure location alerts (via LED), and automatic reintegration of replaced modules.

Figure 1:
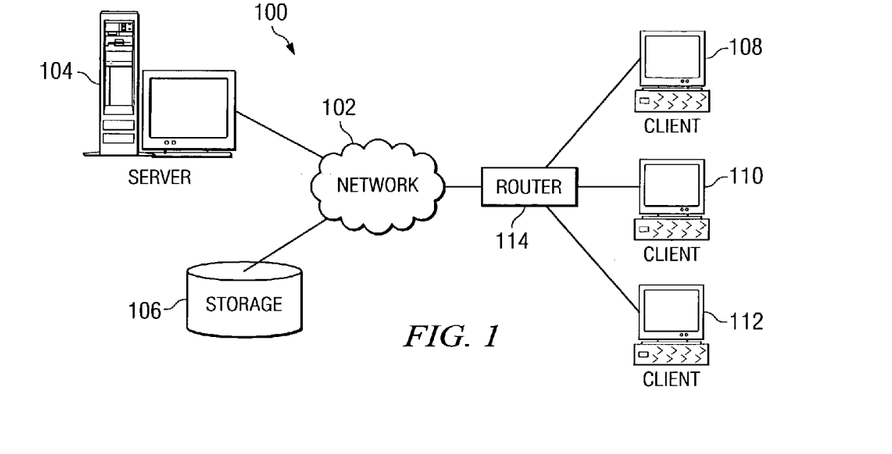
FIG. 1 is a pictorial representation which depicts a data processing system in which the present invention may be implemented.

FIG. 1 depicts a pictorial representation of a network 100 of data processing systems in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. In accordance with the present invention, some, and preferably all, of the communication links are high speed optical links that use a fiber optic cable infrastructure such as Fibre Channel. For example, the communication links are preferably high density large scale high speed links that are greater than or equal to one gigabit per second optical network links. Network 100 may be or include a Fibre channel Storage Area Network (SAN) or a high performance gigabit Ethernet storage and data network. Thousands of optical connections between the clients, servers, switches, routers, converters, and storage systems exist. Each may utilize the present invention.

In the depicted example, a server 104 is connected to network 102 along with storage unit 106. In addition, clients 108, 110, and 112 also are connected to network 102 through a network communications device, such as router 114. Network 102 may include permanent connections, such as wire or fiber optic cables, or temporary connections made through telephone connections. The communications network 102 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 104 without departing from the scope of the present invention. Moreover, as used herein, communications include those enabled by wired or wireless technology.

Clients 108, 110, and 112 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 104 provides data, such as boot files, operating system images, and applications to clients 108-112. Clients 108, 110, and 112 are clients to server 104. Network data processing system 100 may include additional servers, clients, and other devices not shown. FIG. 1 is intended as an example, and not as an architectural limitation for the present invention.

Figure 2A:
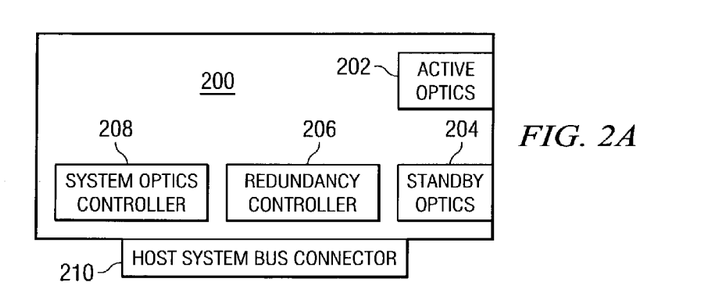
FIG. 2A illustrates a diagram of a single optical embedded network interface on a computer circuit board that includes active and standby optical modules in accordance with the present invention.

FIG. 2A illustrates a diagram of a single optical network adapter card 200 that includes both active and standby optics in accordance with the present invention. This single network adapter card may be inserted into a computer system, switch, router, or other device in order to connect the device to the network of FIG. 1. Card 200, as depicted, includes two optical modules. Although two modules are depicted, any number of optical modules may be included on the single network adapter card. One of these modules will be designated as the active module and will be used by card 200 to communicate with a network, such as network 102. As illustrated by FIG. 2A module 202 has been designated as the active module. The other module 204 will be used as a standby module. If active module 202 fails, this failure will be detected and the standby module 204 will become designated as the active module 202. Both active optical module 202 and standby optical module 204 exist on the same card.

This single card 200 is inserted into a device, such as a host computer system, utilizing a host system bus connector 210. Thus, active and redundant optics are both provided on a single network card that will occupy only one card slot.

The present invention provides for the addition of a redundancy controller 206 that manages the redundancy features of the present invention described below. Card 200 also includes a system controller 208 that provides system functions as described by the prior art. The redundancy controller of the present invention provides additional information to the system controller that now may act on this additional information so that an optical module is more readily available for use as compared to prior art systems.

In the preferred embodiment, redundancy controller 206 is separate and apart from system controller 208 and operates as described herein. However, the functionality of redundancy controller 206 may be included within system controller 208 such that only one controller is needed on the network adapter card.

Figure 2B:
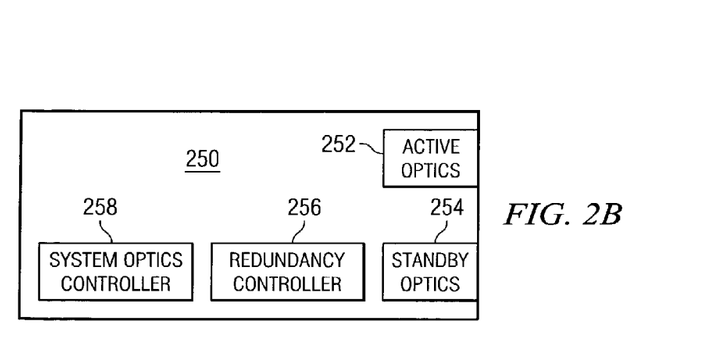
FIG. 2B depicts a diagram of a single circuit board, such as a motherboard, that includes active and standby optical modules in accordance with the present invention.

FIG. 2B depicts a diagram of a single circuit board 250, such as a motherboard, that includes active and standby optical modules in accordance with the present invention. Circuit board 250 includes active optics 252, standby optics 254, redundancy controller 256, and system controller 258. Circuit board 250 and its components operate in a manner such as described herein to provide highly available, redundant optical modules using a single circuit card. Circuit card 250 may be a computer motherboard that is included within a computer system, a storage device, or any other device that includes a network interface that is embedded on a circuit card. When circuit card 250 is a computer system motherboard, other computer components such as the CPU, cache, and other necessary components are also included on card 250. In this manner, an embedded network interface that incorporates and executes the present invention may be included on a circuit card that may also include other data processing functions.

Figure 3:
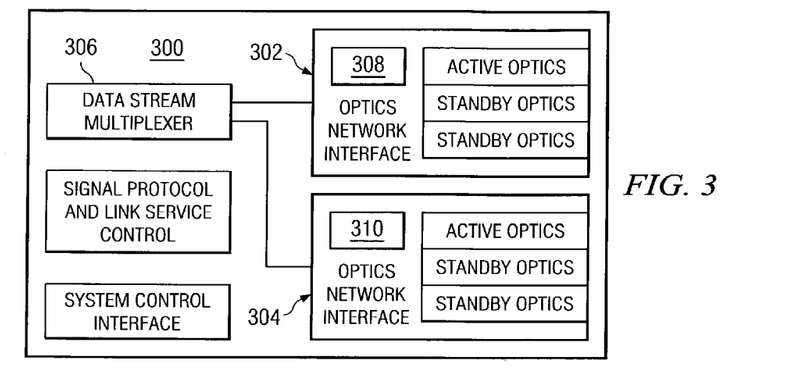
FIG. 3 illustrates a diagram of a single adapter card that includes multiple (N) optical network interfaces in which each interface has multiple (M) standby optical modules in accordance with the present invention.

FIG. 3 illustrates a diagram of a single card 300, such as a relay extender card, that includes multiple (N) optical network interfaces 302 and 304 in which each interface has multiple (M) standby optical modules in accordance with the present invention. Each interface includes a redundancy controller, such as redundancy controllers 308 and 310. A data stream multiplexer 306 is used to select one of the interfaces to provide communication.

The present invention is extendable to larger than a single 2-way optical module configuration. There are optical relay devices and multiport devices (commonly called network backbones or trunks) in which many optical modules are used to relay multiple light signals. These devices can benefit from extended redundancy function. For instance, if an optical network extender device packages 10 active optical modules on a network adapter or embedded network interface, then 10 optical 3-way switches each controlling 3 optical modules may be used as backups in the event of multiple failures. Each optical switch can have up to M backup optical modules so that N×M configurations are supported, where N is the number of active optical modules and M is the number of standby or backup optical modules supported by each switch. In the aforementioned example N=10 and M=3. The redundancy controller simply manages N independent M-way switched redundant configurations, or is instantiated N times to manage each switch independently as depicted by FIG. 3. All N network connections do not require any additional external network resources and achieves M-way redundancy, achieving a significant cost advantage over redundant solutions requiring M separate multiple network connections.

Figure 4:
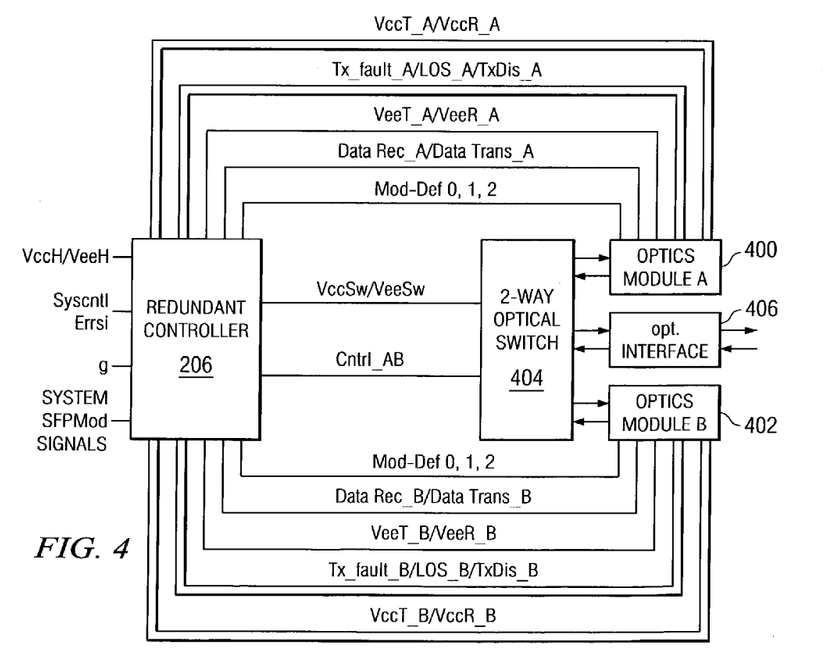
FIG. 4 illustrates the interconnection of a system controller and a redundant controller and the active and standby optical modules utilizing an optical switch in accordance with the present invention.
Figure 6:
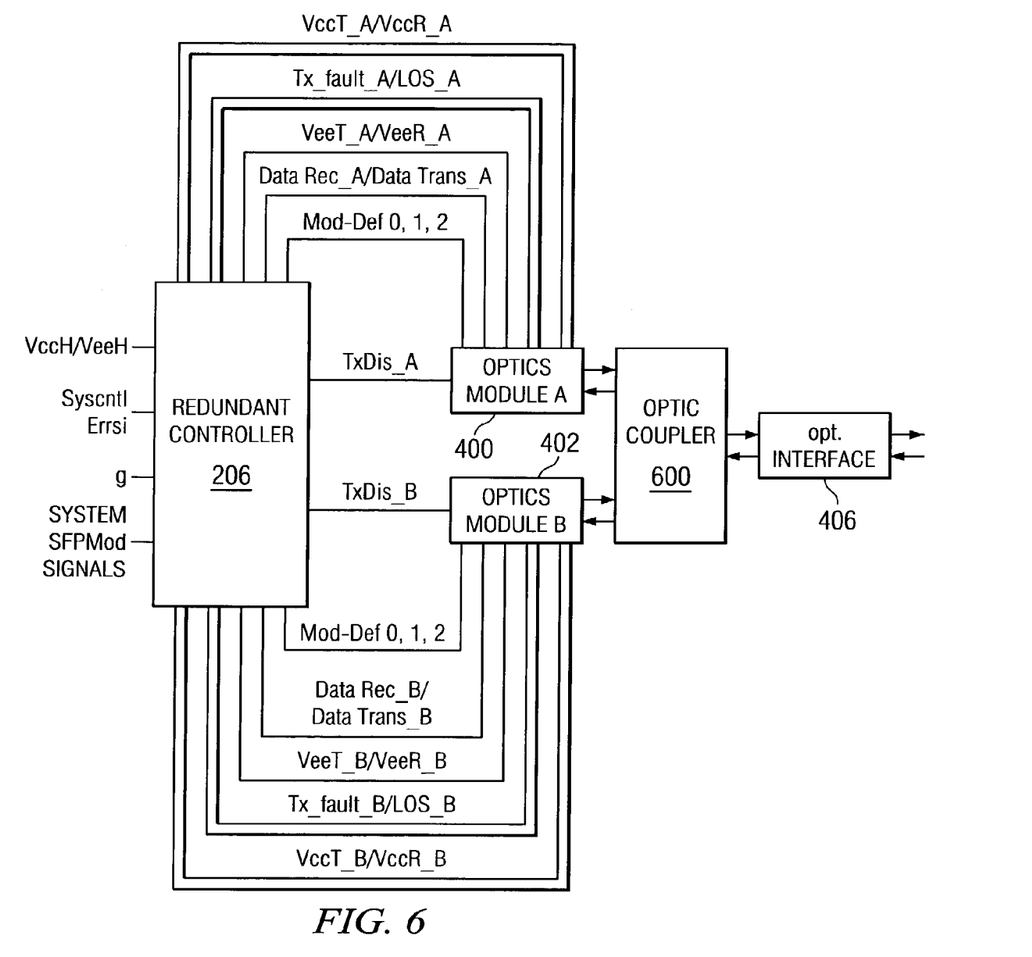
FIG. 6 illustrates the interconnection of a system controller and a redundant controller and the active and standby optical modules utilizing an external coupler in accordance with the present invention.

FIG. 4 illustrates the interconnection of a system controller and a redundant controller and the active and standby optical modules utilizing an optical switch in accordance with the present invention. The signal line definitions depicted in FIGS. 4 and 6 are based on the Small Form-factor Pluggable (SFP) Transceiver specification.

A redundant controller 206 (see FIG. 2A) is coupled to a first optical module 400, a second optical module 402, and a two-way optical switch 404. Either optical module 400 or 402 may operate as active optical module 202 while the other module operates as standby module 204 (see FIG. 2A). As described below, if the active optical module ceases to operate properly, the other optical module will become the active optical module. When the faulty optical module is replaced and after its operation is verified, that replaced module will become the standby module.

Redundant controller 206 monitors the health of each optical module and upon a detection of a failure of the module that is designated as the active module, designates the standby module as the active module. Thus, the standby module becomes the active optical module and the network adapter card or embedded network interface is able to continue to process optical signals.

Switch 404 is also coupled to an optical interface 406 which is used to transmit information to and receive information from the network to which the adapter card that includes switch 404 is connected.

Redundant controller 206 is coupled to system controller 208 (see FIG. 2A) utilizing the signals depicted by FIG. 4. In this manner, redundant controller 206 provides information to the system controller about the health of each module, and notifies the system controller when a module needs to be or has been replaced.

The following are definitions of the signals depicted by FIGS. 4 and 6.

Mod-Def_0: Indicates that the optical module has been physically removed or damaged;
Mod-Def_1: Optical module serial identification clock signal;
Mod-Def_2: Optical module serial identification data signal;
VccT: Transmitter applied voltage;
VccR: Receiver applied voltage;
VeeT: Transmitter ground;
VeeR: Receiver ground;
Tx_fault: Transmission fault detected;
LOS: Loss of signal detected;
TxDis: Disable transmitter;
DataRec: Data receive channel (Data In);
DataTrans: Data transmit channel (Data Out).

The signals external to redundant controller 206 are:
VccH: Redundant controller applied voltage;
VeeH: Redundant controller ground;
VccSw: Optical switch applied voltage;
VeeSw: Optical switch ground;
Cntrl_AB: Optical module A or B select signal;
Loopback Test: Select channel A or B and run loopback test. Test logic is contained in redundant controller 206.
Syscntl: System communication channel used for initialization, communications, and status between redundant controller 206 and system controller 208.
Errsig: Error communication channel used to communicate error conditions and codes.
System SFPMod Signal: The signals that are normally directly connected to the optical module that are modified or diverted by redundant controller 206 only to the active optical module, either module 400 or module 402.

Figure 5:
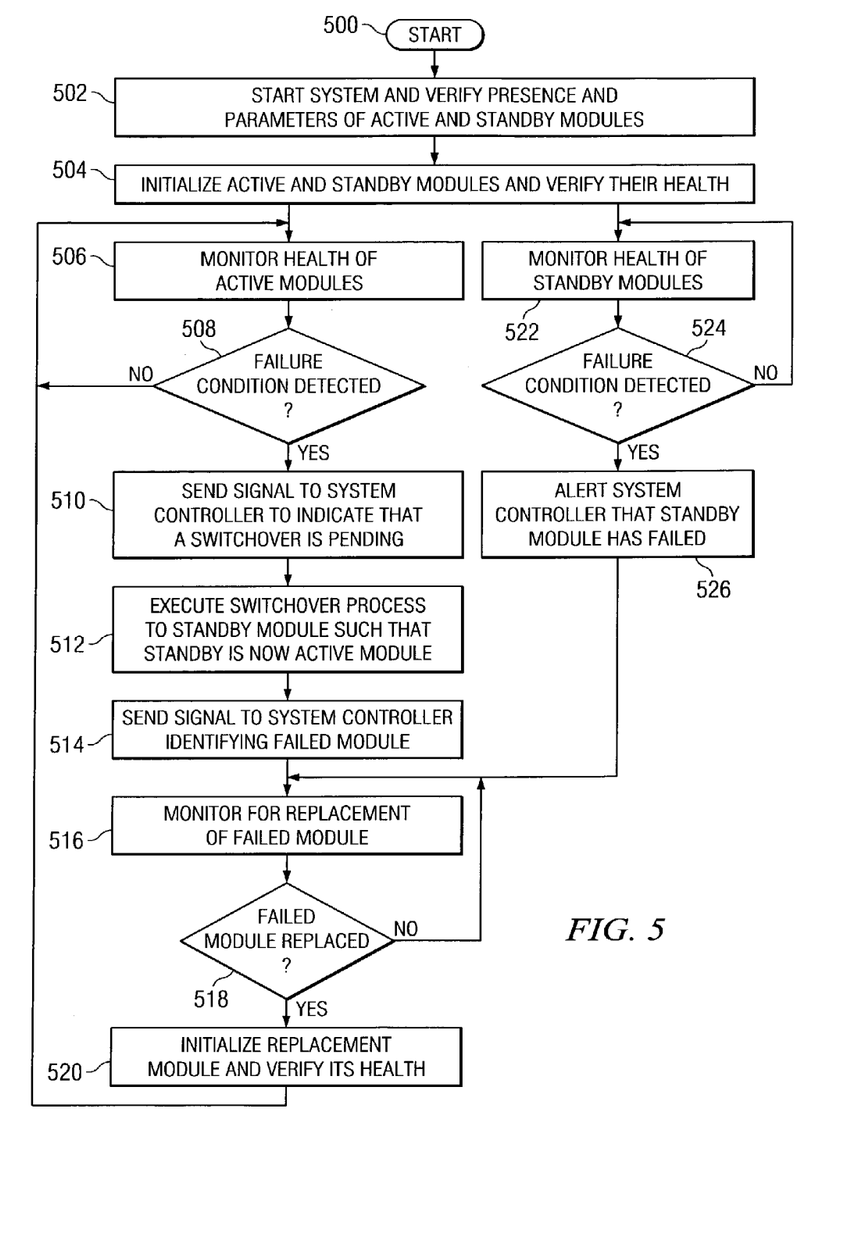
FIG. 5 depicts a high level flow chart which illustrates providing and managing redundant optical modules in accordance with the present invention.

FIG. 5 depicts a high level flow chart which illustrates providing and managing redundant optical modules in accordance with the present invention. The process of FIG. 5 is executed by the redundant controller. The process starts as depicted by block 500 and thereafter passes to block 502 which illustrates starting the system and verifying the presence and parameters of the active and standby modules. All signals and functions are verified by the redundant controller to be in the correct state. If a failure condition is detected, the redundant controller issues an error message to the system controller via the syscntl channel. The presence, function, and device parameters are verified for each optical module by the redundant controller using the Mod-Def 0, 1, 2 signals. The N×M operational state is also set. Next, block 504 depicts the redundant controller initializing the active and standby modules and verifying their health. The configuration is set to identify which module will be the active module and which module(s) are to be used as standby modules. The configuration and operations status is then sent by the redundant controller to the system controller via the syscntl signal. If a failure condition is detected, an appropriate error message is issued to the system controller via Errsig signal.

The process then passes to both blocks 506 and 522. Block 506 illustrates the redundant controller monitoring the health of the active modules. The monitoring process uses two distinct types of algorithms. The first algorithm monitors the transmitter status using the TX_Fault signal and the receiver signal and operational status using the LOS signal. The second algorithm snoops the received data stream using the DataRec_X signal for network protocol level errors such as CRC or framing errors. This type of algorithm is network protocol specific and varies depending on the underlying network transport used, such as Fibre Channel, TCP/IP, or Infiniband.

Next, block 508 depicts a determination of whether or not the redundant controller detected a failure condition. If a determination is made that no failure condition was detected, the process passes back to both blocks 506 and block 522 to continue monitoring. Referring again to block 508, if the redundant controller makes a determination that a failure condition was detected, the process passes back to block 510 which depicts the redundant controller sending a signal to the system controller to indicate that a switchover from the active module to the standby module is pending.

Thereafter, block 512 illustrates the redundant controller executing the switchover process to the standby module such that the standby module becomes the active module. This is accomplished by the redundant controller activating the Cntrl_A or Cntrl_B signal as appropriate. The system controller is notified of the switchover and the new operational status. The process then passes to block 514 which depicts the redundant controller sending a signal to the system controller identifying the module that failed. The failed optical module error signal is then generated and sent via the Syscntl signal to the system controller to identify which module must be replaced. Next, block 516 illustrates the redundant controller monitoring for the replacement of the failed module.

Block 518, then, depicts a determination of whether or not the failed module has been replaced. The redundant controller monitors the Mod-Def_0 signal for the failed optical module to determine when the failed module is physically replaced. The Mod-Def_0 signal is the optical module ground signal and indicates whether the optical module is either destroyed or not present. If a determination is made that the failed module has not been replaced, the process passes back to block 516. Referring again to block 516, if a determination is made that the failed module has been replaced, the process passes to block 520 which illustrates the redundant controller initializing the replacement module and verifying its health. Once the Mod-Def_0 signal indicates that an optical module has been reinserted, the new module is initialized by the redundant controller and the loopback test is run to verify operational status of the new module. The present invention will detect an on-line replacement of a failed optical module in a similar manner through monitoring of the Mod-Def signals for each module as described above. If a module is inserted, the new module is initialized and its operation is verified using the loopback test. The loopback test sends predefined data to the standby module. The standby module's optically transmitted signal (laser diode emitted light) is monitored via a simple receiver and attenuation circuit that simulates the operating transmission load. The redundancy controller compares the attenuated signal to the expected signal in order to determine if the standby module transmitter is functioning properly under operating conditions. The system controller is notified that a new module has been inserted and is working properly. The process then passes to block 506 and block 522.

Block 522 depicts the redundant controller monitoring the health of the one or more standby modules. Each standby module is monitored by periodically checking the working status of the standby module via a loopback test. Next, block 524 illustrates a determination of whether or not a failure condition has been detected by the redundant controller. If a determination is made that a failure condition has not been detected, the process passes back to block 522 and block 506. Referring again to block 524, if a determination is made that a failure condition has been detected, the process passes to block 526 which depicts the redundant controller alerting the system controller that the standby module has failed and needs to be replaced. Thereafter, the process passes to block 516.

FIG. 6 illustrates the interconnection of a system controller and a redundant controller and the active and standby optical modules utilizing an external coupler in accordance with the present invention. Although the preferred embodiment utilizes an optical switch, an external coupler 600 may be utilized to implement the present invention as depicted by FIG. 6.

The present invention provides for a redundant optical module configuration that is monitored and controlled to automatically recover from and verify a single optical module failure using a single physical and logical network connection. Recovery from a single optical module failure is provided without any local network parameter reconfiguration requirements. The configuration recovers from optical failures and allows maintenance replacement procedures to be scheduled and/or deferred and executed without disrupting normal operations.

Extended N×M redundant optical module configuration is provided that is monitored and controlled to recover from single or multiple optical module failures.

The present invention effectively extends the operating life and reliability of optical modules and optical networks at low additional cost and complexity as compared to manufacturing very high reliability optical modules, or deploying dual/redundant network solutions. It provides verification of detected optical module failure via off-line loopback test mode, provides external fault isolation capability by verifying the proper operation of the optical module in the event of failure detection, provides periodic verification of standby optical module status via off-line loopback test mode, monitors optical signal output status signals (TX_Fault and LOS) to determine operational status of optical module, snoops (periodically monitors) received data signals (DataRec) to determine operational status of receiver portion of optical module, verifies the operational status of newly inserted optical modules, and detects on-line withdrawal and replacement of optical module via Mod-Def 0, 1, 2 and reintegrates new module into system configuration.

The invention disclosed herein provides highly available redundant optical modules. The present invention addresses the solution to critical operational and maintenance problems created by the high level of unpredictable failures that optical modules cause in high speed storage and data networks. The invention achieves this in a manner such that only a single embedded network interface or network card and single network connection is required, thus minimizing the cost of implementation and complexity, as well as maximizing network resource utilization. For instance, the failure of a single optical module in a storage network can cause loss or degradation of access to a storage device, just as if the storage device itself had failed or degraded.

The present invention adds a redundant controller, a switch, and a configuration defining active and redundant standby optical modules. All of the existing system, network protocol, and link level controls are not affected by the present invention, and no additional output connection or additional network resources are required.

The present invention is localized to the data streaming level and does not affect any of the existing functions. Thus, a network adapter or embedded network interface that utilizes the present invention appears to the world external to the network interface to behave in a manner that is the same as a prior art network adapter or embedded network interface. However, a network adapter or embedded network interface that utilizes the present invention is significantly more reliable and serviceable than the prior art network adapter or embedded network interface.

The present invention has been designed so that optical module failures in the network interconnection elements, such as adapters and ports, do not affect the operations, maintainability, or configuration of the network.

The present invention has a distinct advantage over existing interconnect elements which experience a complete failure when an optical module fails. Also the present invention requires only a single network connection which provides significant cost, complexity, maintenance, and resource utilization advantages over redundant solutions that would employ dual or multiple separate networks and network connections, and switch over from one network to another network in the event of a detected connection failure (e.g., dual FDDI, dual Ethernet, dual FC HBA).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing highly available, redundant optical modules using a single network connection in a data processing system, said method comprising the steps of:
   providing a network adapter card that occupies only one network slot, the network adapter card including a plurality of optical modules and a redundancy controller, wherein the network adapter card communicates with a network utilizing a first optical module in the plurality of optical modules;
   creating, using the network adapter card, an active module designation for a particular optical module that is currently communicating with the network, whereby the first optical module initially has the active module designation;
   detecting, using the redundancy controller, a failure of the particular optical module that is currently communicating with the network;
   responsive to detecting the failure, changing, using the redundancy controller, the active module designation from the first optical module to a second optical module in the plurality of optical modules;
   verifying, by the redundancy controller, an operational status of each one of the plurality of optical modules by monitoring a transmitter status of each one of the plurality of optical modules and by snooping a data stream received by each one of the plurality of optical modules for network protocol errors;
   detecting, by the redundancy controller, a removal of one of the plurality of optical modules from the network adapter card by monitoring an optical module ground signal;
   receiving, by the redundancy controller, an input signal from a system controller that is included on the network adapter card;
   determining, by the redundancy controller, whether the first optical module or the second optical module is currently designated as the active module; and
   sending, by the redundancy controller, the input signal to only one of the first optical module or the second optical module that is designated as the active module, wherein the input signal is received by the active module only from the redundancy controller, and still further wherein data signals are transmitted directly between the redundancy controller and the first and second optical modules without being transmitted through another device.

2. The method according to claim 1, further comprising:
   coupling a plurality of optical switches to corresponding optical modules of the plurality of optical modules and to the redundancy controller; and
   designating, using the plurality of optical switches, at least one of the plurality of optical modules as having the active module designation.

3. The method according to claim 1, further comprising:
   monitoring, using the redundancy controller, an output status of the particular optical module.

4. The method according to claim 1 wherein the redundancy controller changes the active module designation immediately upon detection of the failure and wherein the redundancy controller changes the active module designation while the network adapter card is operating.

5. The method according to claim 1 wherein the plurality of optical modules comprises a first plurality of optical modules and a second plurality of optical modules, and wherein the method further comprises:
   monitoring the second plurality of optical modules using a second redundancy controller.

6. The method according to claim 1, further comprising:
   detecting, by the redundancy controller, an insertion of a replacement optical module onto the network adapter card by monitoring the optical module ground signal.

7. The method according to claim 6, further comprising:
reporting, by the redundancy controller, the replacement to the system controller coupled to the network adapter card.

8. The method according to claim 6, further comprising:
verifying, by the redundancy controller, an operational status of the replacement optical module.

9. The method according to claim 8, further comprising:
reporting, by the redundancy controller, the operational status to the system controller.

10. The method according to claim 1, further comprising:
performing, by the redundancy controller, a loopback test on one of the plurality of optical modules, wherein the loopback test comprises:
sending, by the redundancy controller, a test signal to one of the plurality of optical modules;
processing the test signal using the one of the plurality of optical modules;
reflecting, by the one of the plurality of optical modules, an output generated as a result of the processing to the redundancy controller without reflecting the output to the network.

11. The method according to claim 10 wherein detecting the failure is performed utilizing the output.

12. A method for providing highly available, redundant optical modules using a single network connection in a data processing system, said method comprising the steps of:
providing an embedded network interface integrated directly on a circuit board, the embedded network interface including a plurality of optical modules and a redundancy controller, wherein the embedded network interface communicates with a network utilizing a first optical module in the plurality of optical modules;
creating, using the embedded network interface, an active module designation for a particular optical module that is currently communicating with the network, whereby the first optical module initially has the active module designation;
detecting, using the redundancy controller, a failure of the particular optical module that is currently communicating with the network;
responsive to detecting the failure, changing, using the redundancy controller, the active module designation from the first optical module to a second optical module in the plurality of optical modules;
verifying, by the redundancy controller, an operational status of each one of the plurality of optical modules by monitoring a transmitter status of each one of the plurality of optical modules and by snooping a data stream received by each one of the plurality of optical modules for network protocol errors;
detecting, by the redundancy controller, a removal of one of the plurality of optical modules from the network adapter card by monitoring an optical module ground signal;
receiving, by the redundancy controller, an input signal from a system controller that is included on the network adapter card;
determining, by the redundancy controller, whether the first optical module or the second optical module is currently designated as the active module; and
sending, by the redundancy controller, the input signal to only one of the first optical module or the second optical module that is designated as the active module, wherein the input signal is received by the active module only from the redundancy controller, and still further wherein data signals are transmitted directly between the redundancy controller and the first and second optical modules without being transmitted through another device.

* * * * *